(No Model.)
L. PARHAM.
FEEDER FOR THRASHING MACHINES.
No. 328,058. Patented Oct. 13, 1885.
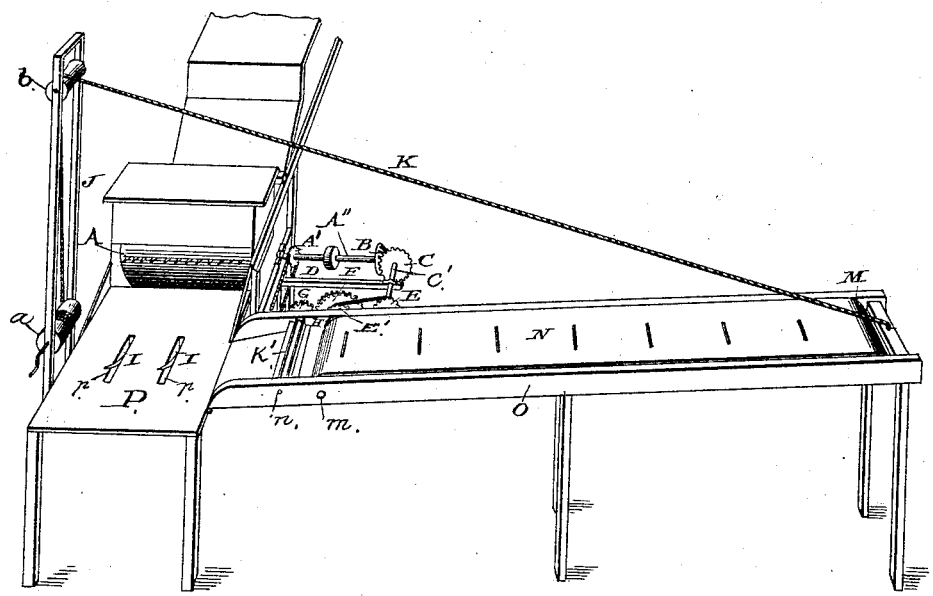
Witnesses:
H. J. Bennett
E. B. Sitton
Inventor.
Lewis Parham

UNITED STATES PATENT OFFICE.

LEWIS PARHAM, OF PALERMO, ILLINOIS.

FEEDER FOR THRASHING-MACHINES.

SPECIFICATION forming part of Letters Patent No. 328,058, dated October 13, 1885.

Application filed November 21, 1884. Serial No. 148,546. (No model.)

*To all whom it may concern:*

Be it known that I, LEWIS PARHAM, a citizen of the United States, residing at Palermo, in the county of Edgar and State of Illinois, have invented certain new and useful Improvements in Feeders for Thrashing-Machines, of which the following is a full, clear, and exact description, reference being had to the accompanying drawing, forming part of this specification, in which the figure represents a perspective view of a straw carrying and feeding attachment with my improvements attached.

My invention relates to feeding attachments for thrashing-machines; and it consists in the combination of devices hereinafter described and claimed.

To enable others skilled in the art to make and use my improvements, I will now proceed to describe the exact manner in which I have carried it out.

In the said drawing, A represents a cylinder provided with a series of teeth or projections, as shown. The cylinder is mounted upon a shaft, A″, suitably journaled in the sides of the frame and projecting some distance beyond the same.

Upon the shaft, in close proximity to the frame, is keyed a toothed wheel, A′, and upon the outer end of this shaft is secured a bevel gear-wheel, B.

Projecting from the frame of the machine is an arm or beam, D, which furnishes a bearing for a transverse shaft, C′, carrying at one end a bevel gear-wheel, C, which meshes with the gear-wheel B, but whose diameter is about one-half larger than the diameter of said gear C.

A sprocket-wheel, E, is mounted on the opposite end of shaft C′, and it is connected by a chain to a similar gear, E′, on a shaft, m, which carries the drum H, around which the endless apron N passes. The shaft m also carries a gear-wheel, F, of increased diameter, which meshes with a pinion on a shaft, n. Immediately in front of the shaft m is journaled a shaft, n, carrying a cylinder or cutter, K′, provided with a series of knives, as shown.

Near the cylinder or cutter K′, and preferably a little below it, is a table, P, provided with slots p, through which project the arms I, which act as feeders in forcing the material to the cylinder A. Secured to the frame of the attachment is a vertical frame, J, having journaled in its upper and lower end the windlass a and pulley b, while a rope or chain, K, after passing over the pulley, extends to the end of the straw-carrying frame O, to which it is then secured, and the frame O being hinged to the frame of the table P, enables the operator to raise or lower the straw-carrying frame to any inclination desired.

The sprocket-wheel A′ on the shaft A″ is connected to a shaft which operates the arms I by a chain or band, the velocity of the several gears and their attachments being regulated by their varying sizes.

From the foregoing description it is evident when the sheaves are placed upon the carrier or apron they are carried forward until they come in contact with the cylinder or cutter K, the blades of which sever the bands and force the sheave upon the feeding-table P. The arms I then take the sheave and feed it to the cylinder A, from whence it is discharged in the usual manner.

Having thus fully described my invention, what I claim as new, and desire to secure by Letters Patent, is—

In a feeder for thrashing-machines, the combination of the frame, a cylinder, a shaft projecting to one side of the cylinder, a shaft, C′, an arm, D, supporting the shaft, a frame, O, apron N, a cutter, suitable gearing for operating the apron and cutter from the cylinder-shaft, a slotted feed-table, P, feeders I, working through the slots in the table, and gearing for operating the feeders, substantially as herein described.

LEWIS PARHAM.

Witnesses:
E. B. TILTON,
H. J. BENNETT.